United States Patent
Xu et al.

(10) Patent No.: US 11,005,586 B2
(45) Date of Patent: May 11, 2021

(54) REFERENCE SIGNAL MONITORING MECHANISM FOR REMOTE INTERFERENCE MANAGEMENT

(71) Applicant: QUALCOMM Incorporated, San Diego, CA (US)

(72) Inventors: Huilin Xu, San Diego, CA (US); Xipeng Zhu, San Diego, CA (US); Joseph Binamira Soriaga, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/524,035

(22) Filed: Jul. 27, 2019

(65) Prior Publication Data

US 2020/0044764 A1 Feb. 6, 2020

Related U.S. Application Data

(60) Provisional application No. 62/712,770, filed on Jul. 31, 2018.

(51) Int. Cl.
*H04J 11/00* (2006.01)
*H04W 72/08* (2009.01)
(Continued)

(52) U.S. Cl.
CPC ........ *H04J 11/0056* (2013.01); *H04L 5/0048* (2013.01); *H04L 25/03006* (2013.01); *H04W 24/10* (2013.01); *H04W 72/082* (2013.01)

(58) Field of Classification Search
None
See application file for complete search history.

(56) References Cited

U.S. PATENT DOCUMENTS

| | | | |
|---|---|---|---|
| 2013/0028107 A1* | 1/2013 | Ho | H04L 1/0001 370/252 |
| 2014/0016497 A1* | 1/2014 | Seo | H04W 72/1268 370/252 |

(Continued)

FOREIGN PATENT DOCUMENTS

| | | | | |
|---|---|---|---|---|
| WO | 2013110217 A1 | 8/2013 | | |
| WO | 2014079052 A1 | 5/2014 | | |
| WO | WO-2014079052 A1 * | 5/2014 | ........... | H04L 5/0032 |

OTHER PUBLICATIONS

International Search Report and Written Opinion—PCT/US2019/043829—ISA/EPO—dated Nov. 19, 2019.

*Primary Examiner* — Jamaal Henson
(74) *Attorney, Agent, or Firm* — Qualcomm Incorporated

(57) ABSTRACT

Certain aspects of the present disclosure provide techniques for reference signal monitoring and transmission for remote interference management. In some cases, an aggressor base station decides to monitor for reference signals (RSs) transmitted from at least one victim BS, for example, regardless of an amount of interference from at least one remote BS detected by the first base station and participating in a remote interference mitigation (RIM) process based on the monitored RS. In some cases, a first BS transmits reference signals (RSs) as part of a remote interference mitigation (RIM) process, in response to a determination that it is an aggressor BS whose downlink transmissions possibly interfere with reception of uplink transmissions by at least one remote BS, a victim BS whose reception of uplink transmissions are possibly interfered with by downlink transmissions from the at least one remote BS, or both an aggressor BS and a victim BS.

16 Claims, 14 Drawing Sheets

(51) Int. Cl.
*H04W 24/10* (2009.01)
*H04L 5/00* (2006.01)
*H04L 25/03* (2006.01)

(56) References Cited

U.S. PATENT DOCUMENTS

2015/0016419 A1* 1/2015 Kim .................. H04W 48/14
                                            370/331
2017/0289917 A1   10/2017 Visotsky et al.

* cited by examiner

REFERENCE SIGNAL MONITORING MECHANISM FOR REMOTE INTERFERENCE MANAGEMENT

CROSS-REFERENCE TO RELATED APPLICATIONS

This application claims benefit of U.S. Provisional Patent Application Ser. No. 62/712,770, filed Jul. 31, 2018, which is expressly incorporated herein by reference in its entirety.

INTRODUCTION

Aspects of the present disclosure relate to wireless communications, and more particularly, to techniques for managing interference caused by remote base stations.

FIELD

Aspects of the present disclosure relate to wireless communications, and more particularly, to techniques for remote interference management.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a first base station (BS). The method generally includes deciding to monitor for reference signals (RSs) transmitted from at least one remote BS, regardless of an amount of interference from the at least one remote BS detected by the first base station and participating in a remote interference mitigation (RIM) process based on the monitored RS.

Certain aspects provide a method for wireless communication by a first base station (BS). The method generally includes generating a message to inform at least one remote BS to begin monitoring for reference signals (RSs) transmitted from the first BS as part of a remote interference mitigation (RIM) process and sending the message to the at least one remote BS via a backhaul link.

Certain aspects provide a method for wireless communication by a first base station (BS). The method generally includes determining that the first BS is an aggressor BS whose downlink transmissions possibly interfere with reception of uplink transmissions by at least one remote BS, a victim BS whose reception of uplink transmissions are possibly interfered with by downlink transmissions from the at least one remote BS, or both an aggressor BS and a victim BS and transmitting reference signals (RSs) as part of a remote interference mitigation (RIM) process, in response to the determination.

Certain aspects provide operations that may be performed by a network entity. The method generally includes determining a set of one or more base stations (BSs) whose downlink transmissions possibly interfere with reception of uplink transmissions by at least one remote BS or whose reception of uplink transmissions are possibly interfered with by downlink transmissions from the at least one remote BS, or both and signaling the set of BSs to semi-statically transmit reference signals (RSs) as part of a remote interference mitigation (RIM) process.

Certain aspects of the present disclosure also provide various apparatus, means, and computer readable media capable of (or having instructions stored thereon for) performing the operations described above.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
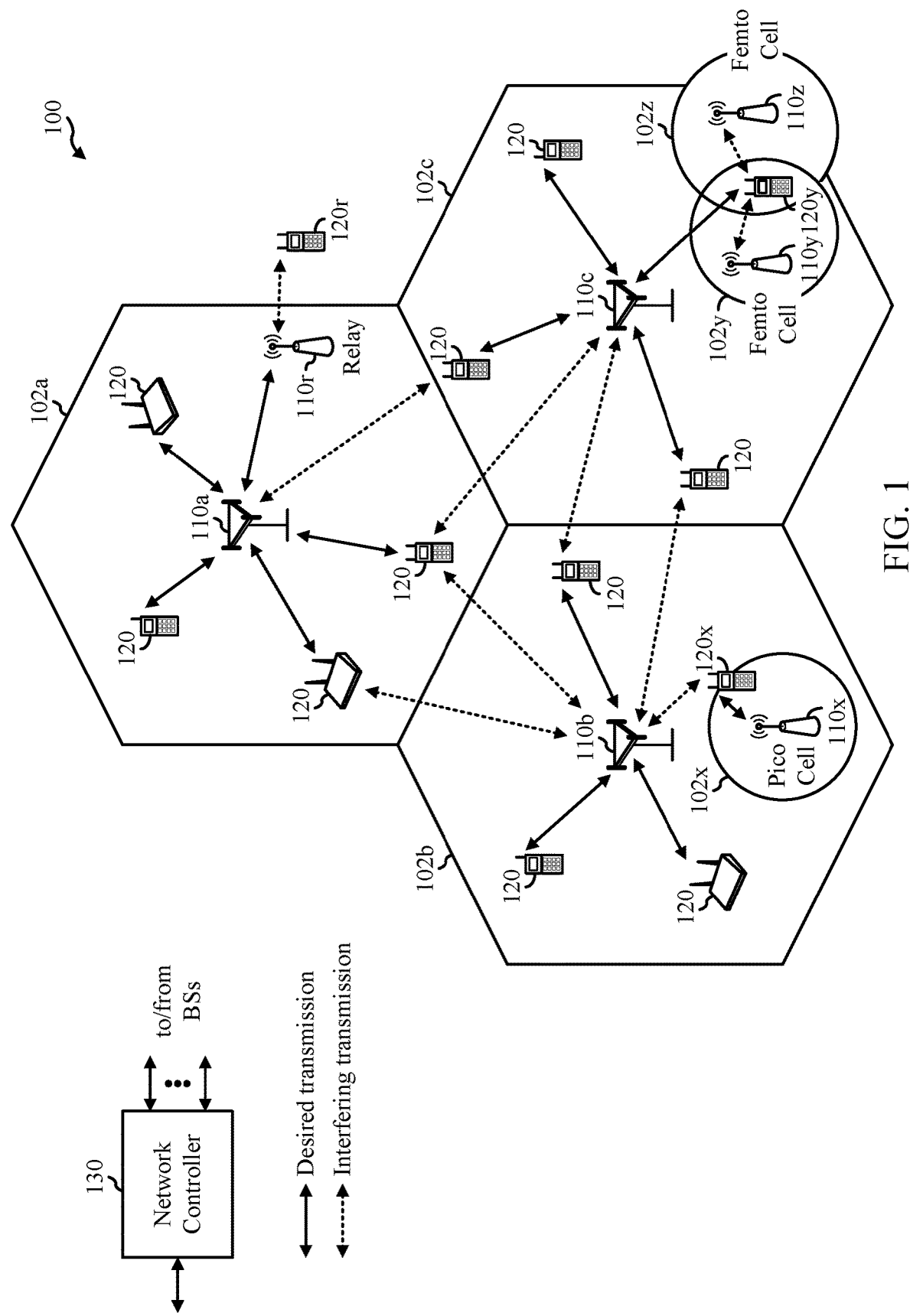
FIG. 1 is a block diagram conceptually illustrating an example telecommunications system, in accordance with certain aspects of the present disclosure.

Aspects of the present disclosure present disclosure provide apparatus, methods, processing systems, and computer readable mediums for reference signal monitoring for managing interference caused by remote base stations.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. The wireless communication network 100 may be a New Radio (NR) or 5G network and base stations 110 may perform remote interference detection as discussed herein. For example, one or more base stations 110 (e.g., 110a and 110a) may be victims of interference caused by a remote base station 110r (referred to as an aggressor). Such base stations may participate in techniques described herein for mitigating this remote interference, for example, by performing operations shown in FIGS. 9 and 11.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things devices, which may be narrowband Internet-of-Things devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network.

In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
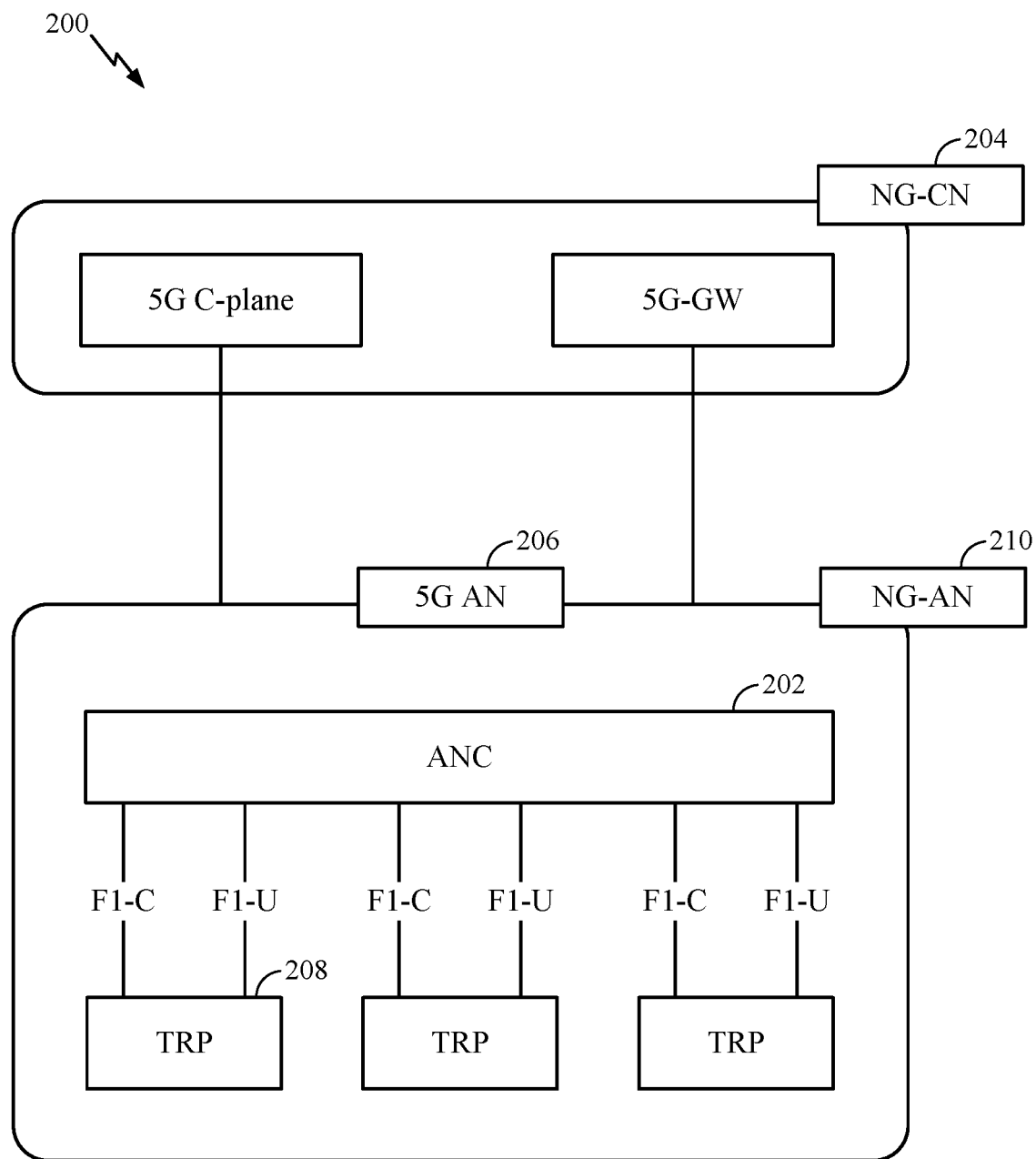
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
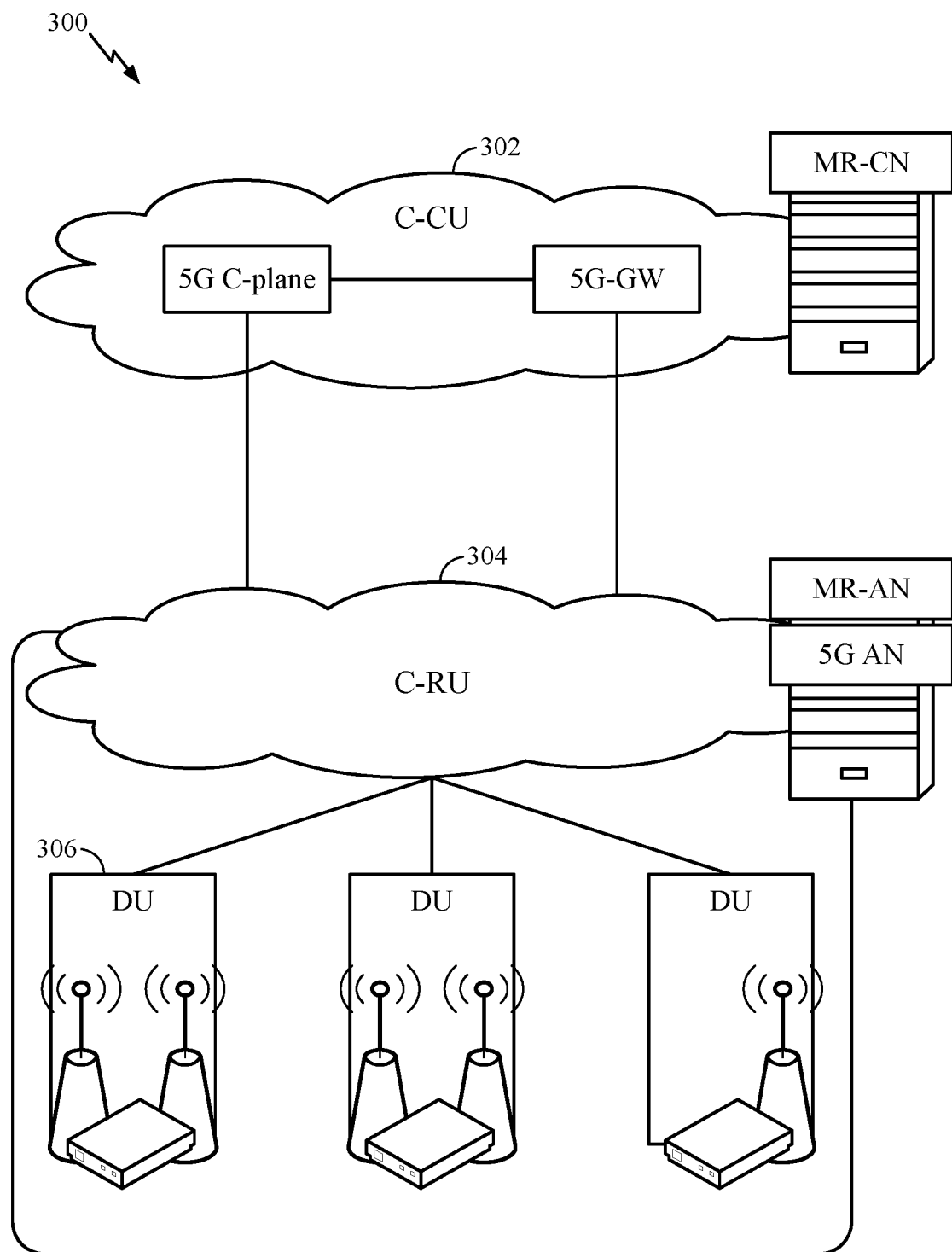
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
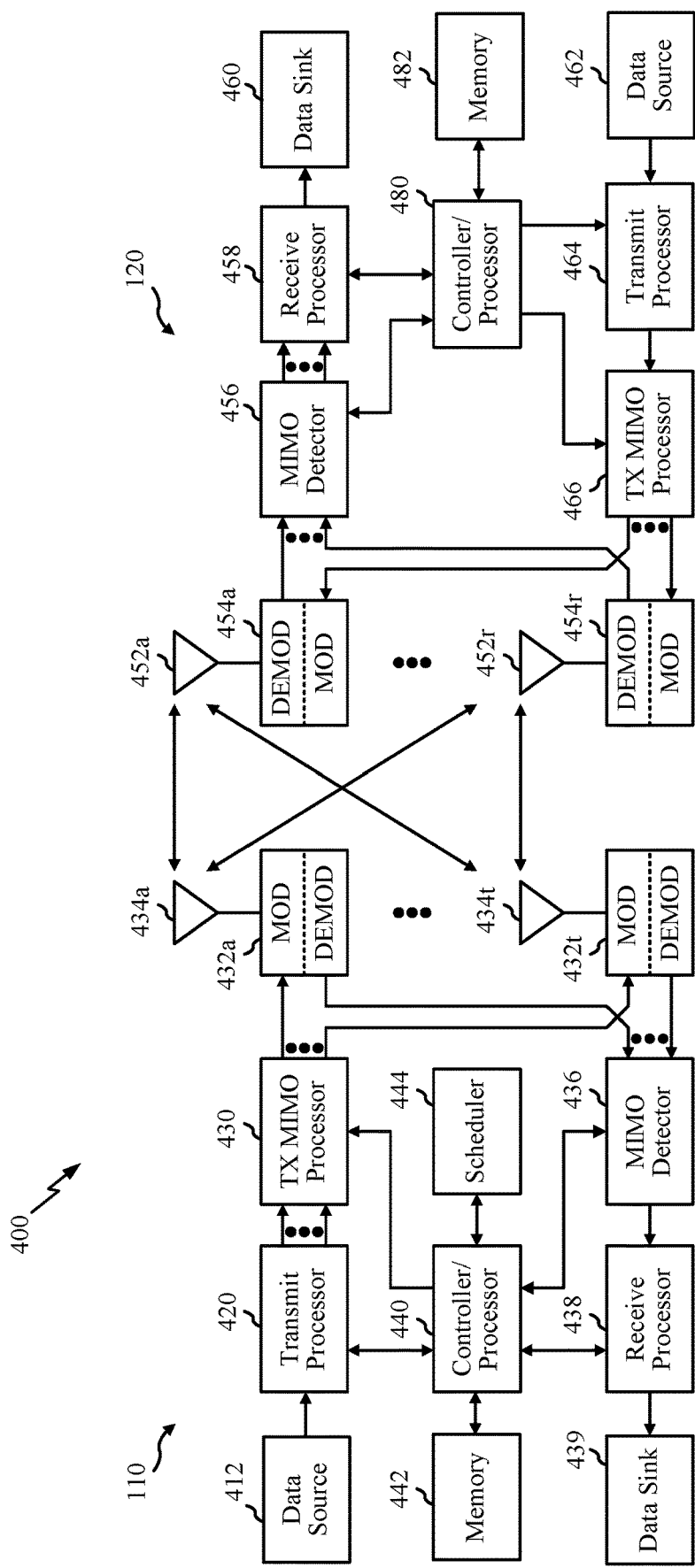
FIG. 4 is a block diagram conceptually illustrating a design of an example base station (B S) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 5:
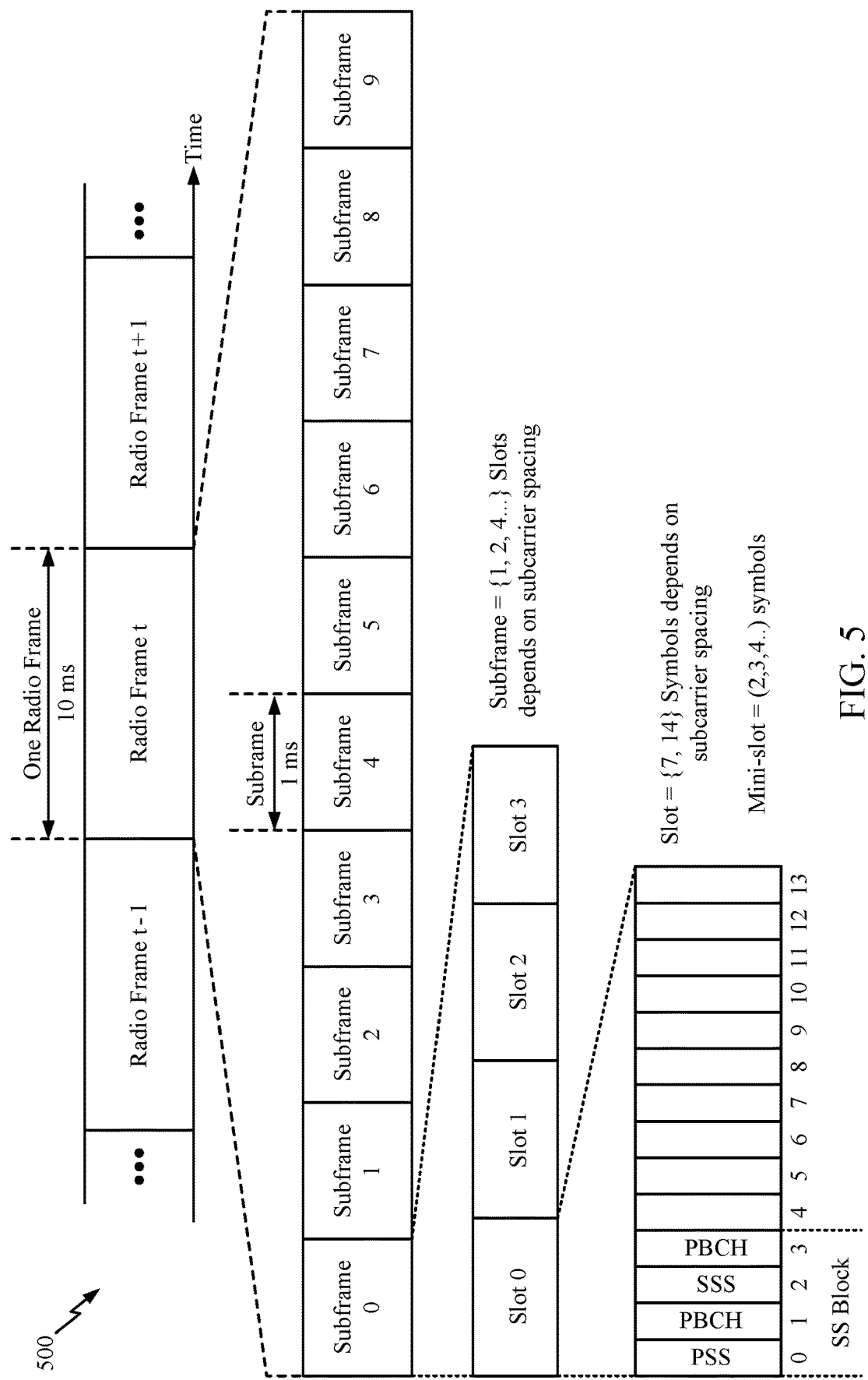
FIG. 5 illustrates an example of a frame format for a new radio (NR) system, in accordance with certain aspects of the present disclosure.

FIG. 5 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Figure 6:
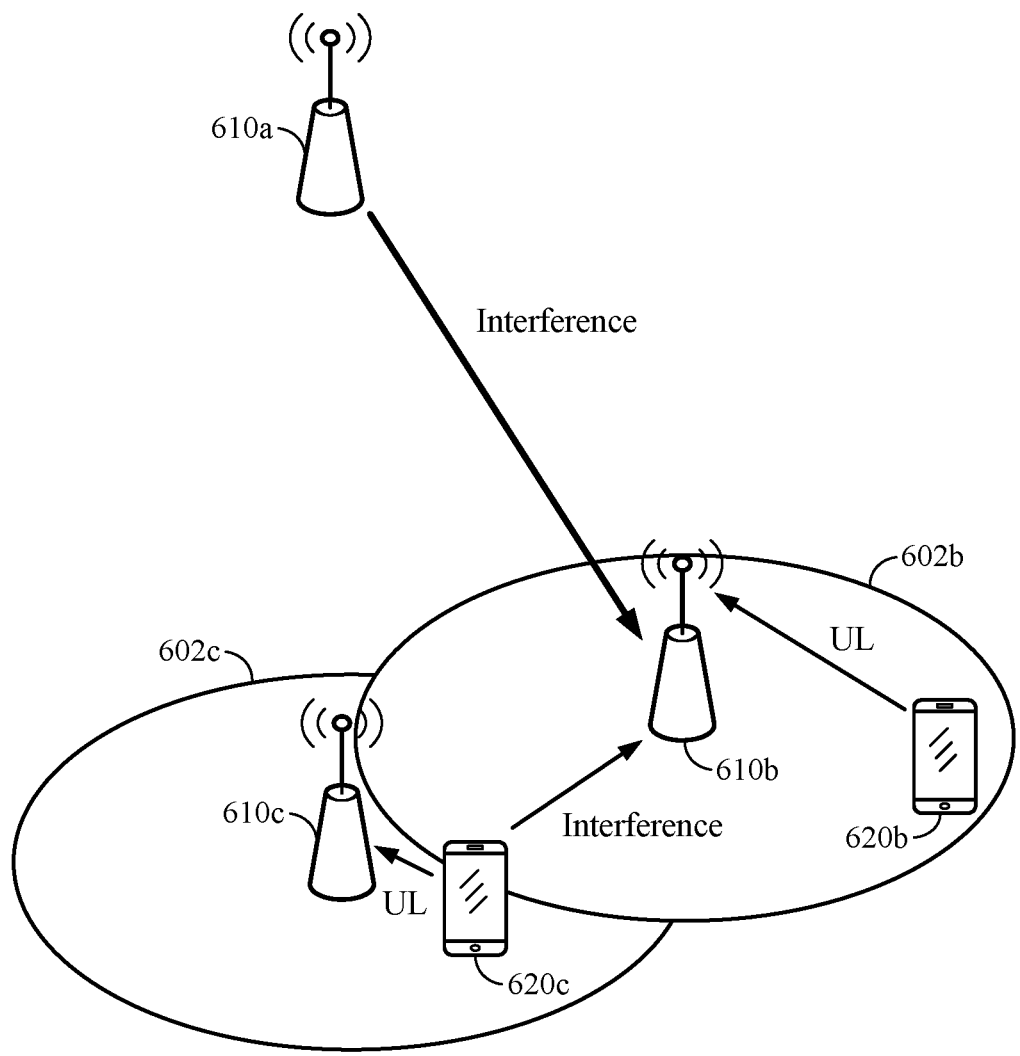
FIG. 6 illustrates remote interference that may occur in a telecommunication system, in accordance with certain aspects of the present disclosure.

In NR, a synchronization signal/physical broadcast channel (SS/PBCH) block is transmitted (also referred to as a synchronization signal block (SSB)). The SS/PBCH block includes a PSS, a SSS, and a two symbol PBCH. The SS/PBCH block can be transmitted in a fixed slot location, such as the symbols 2-5 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS/PBCH blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, Internet-of-Things communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Remote Interference Management

Remote interference is a type of cross-link interference that may occur in a telecommunication system. In particular, in remote interference, DL transmissions of a first or remote base station (sometimes referred to as the "aggressor") become interference to the UL reception of another base station (sometimes referred to as the "victim"). Accordingly, the DL transmissions of the aggressor may interfere with the ability of the victim to successfully receive and decode UL transmissions (e.g., random access channel (RACH) signals such as physical RACH (PRACH), etc.) from UEs in the cell of the victim. For example, though normally antennas of a base station are oriented (e.g., tilted down) to try and ensure DL transmissions from the base station are only observable in the cell of the base station, that is not always the case. For example, the DL transmissions from the base station may be reflected (e.g., on a mountain, ocean, cloud, etc.) to a distance greater than the cell of the base station.

FIG. 6 illustrates remote interference that may occur in a telecommunication system. FIG. 6 shows a first BS 610r (e.g., a BS 110r as shown and described in FIG. 1) and a second BS 610b with a coverage area shown by cell 602b. FIG. 6 further shows a UE 620b (e.g., a UE 120 as shown and described in FIG. 1) connected to second BS 610b.

In certain aspects, as illustrated in FIG. 6, DL transmissions from BS 610r (i.e., the aggressor) may interfere with UL transmissions from UE 620b to BS 610b (i.e., the victim) at BS 610b. In particular, the DL transmissions from BS 610r may be received at BS 610b and interfere with the UL transmissions from UE 620b received at BS 610b. Such remote interference between UL and DL transmissions may cause problems and poor performance. Interference may not only occur in the same channel, but also across adjacent channels.

In certain aspects, to overcome such remote interference between UL and DL transmissions, the transmission direction (e.g., UL and DL) may be aligned (also referred to as synchronized) between deployments (e.g., BSs 610r and 610b), meaning that both BSs 610r and 610b schedule UL transmissions at the same time and DL transmissions at the same time, so DL transmissions cannot interfere with UL transmissions. Accordingly, large guard bands are not needed between channels used for DL and UL, meaning the spectrum resources are utilized efficiently. However, the deployments of BS 610r and 610b may then be restricted from using different UL/DL configuration timings, which may impact performance as a strict configuration must always be adhered to.

Figure 10:
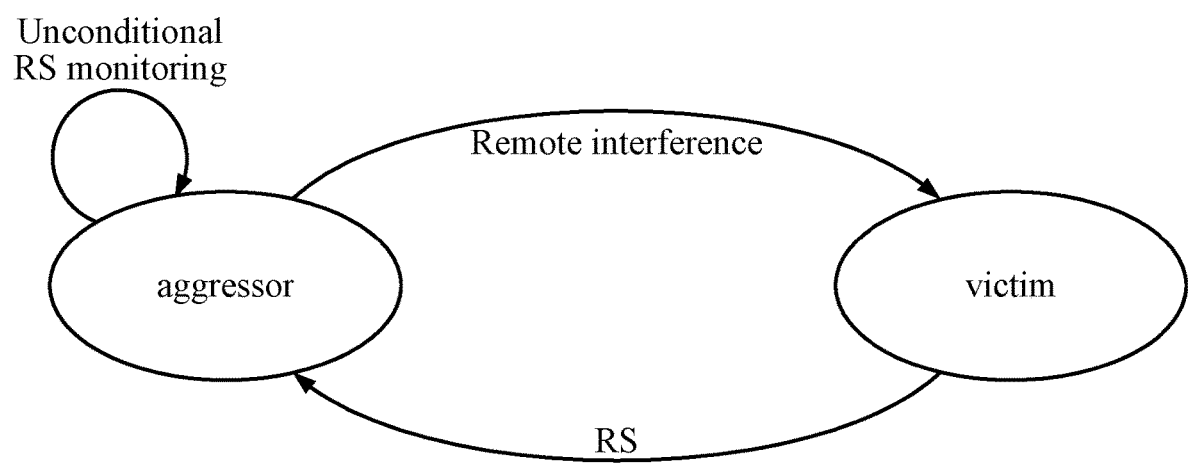
FIG. 10 illustrates an example system in which remote interference management in accordance with the operations of FIG. 9 may be implemented.

Further, in certain cases, even if the BSs 610r and 610b are synchronized, there may still be remote interference. For example, as illustrated in FIG. 10, DL transmissions from an aggressor BS 610r may be received with a delay (e.g., due to the path taken by the DL transmissions) at the victim BS 610b, such that the DL transmissions are received in a time period used for UL communication by the victim BS 610b.

Figure 7:
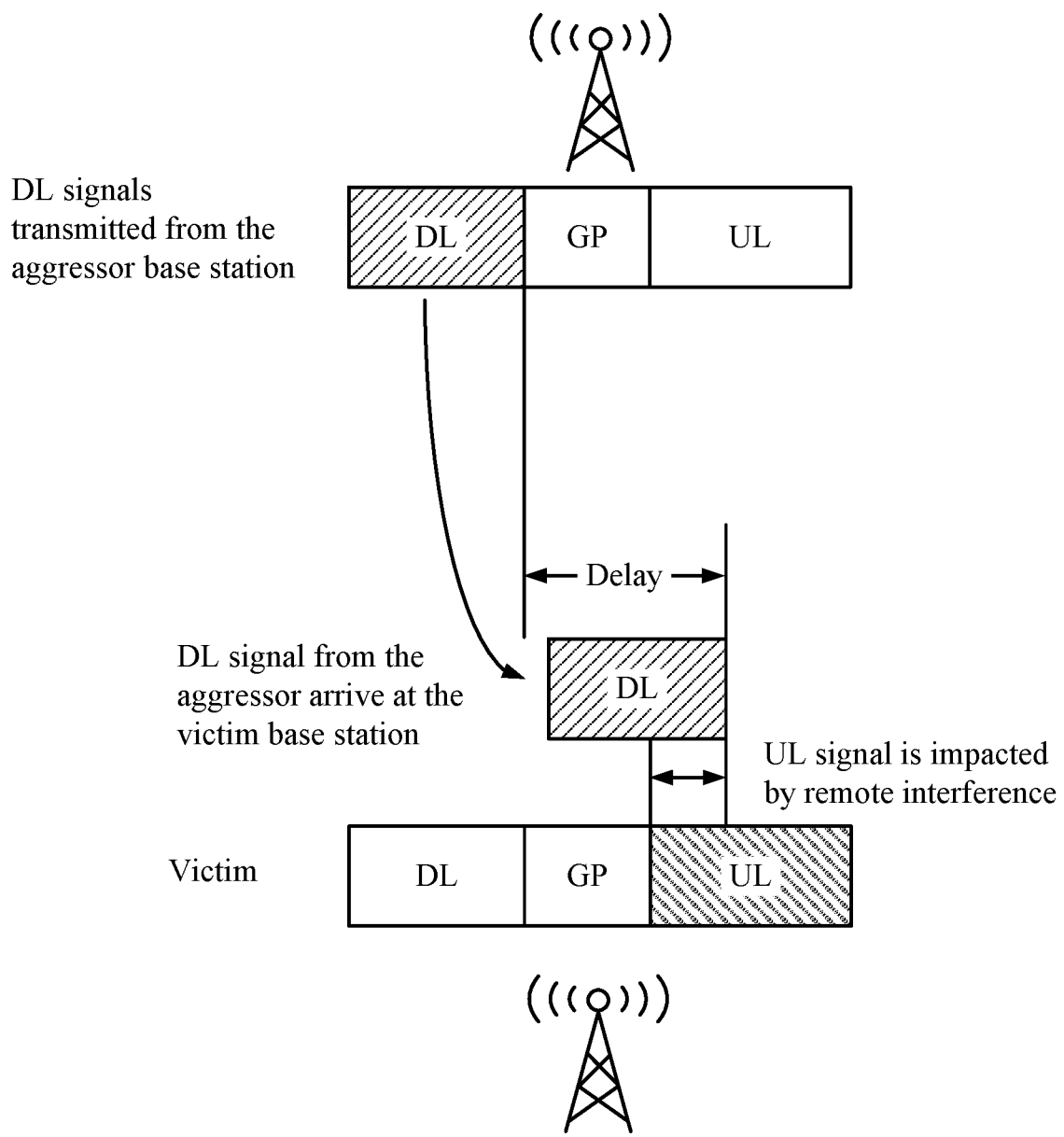
FIG. 7 illustrates an example of remote interference to a victim cell by an aggressor cell, in accordance with certain aspects of the present disclosure.

FIG. 7 illustrates the timing of this type of remote interference and how such interference may lead to downlink signals falling into uplink subframes. As shown, downlink signals transmitted from the aggressor base station during downlink subframes may arrive at the victim base station during the guard period and/or uplink subframes (e.g., due to delay caused by atmospheric ducting). For example, an atmospheric duct will cause long-distance downlink (DL) signals of base stations to travel through the atmosphere with a long transmission delay but with a very low attenuation, thereby, affecting the wireless communication systems performance. If the base stations in the above mentioned systems are supposed to transmit in certain time periods and to receive uplink signals from user equipments (UEs) in other periods, it is possible that the signals from a base station travelling through an atmospheric duct will reach another base station when this other base station is supposed to receive uplink signals from the UEs. As a result, this other BS (victim BS) may experience remote interference caused by a base station (aggressor BS) that is located very far away (e.g., 64-400 kms away).

Accordingly, certain aspects herein relate to determining that interference experienced at a victim BS is due to remote interference from DL transmission of a remote aggressor BS. In certain aspects, the victim BS and/or aggressor BS may then perform remote interference management (RIM) based on determining that interference experienced at a victim BS is due to remote interference from DL transmission of a remote aggressor BS. In particular, the victim BS and/or aggressor BS perform RIM to mitigate interference at the victim BS. For example, in certain embodiments, the victim BS may inform the aggressor BS of the remote interference (e.g., over the air, using a reference signal, via a backhaul, etc.). The aggressor BS may then reduce transmission power of its transmission on the DL, not transmit on certain resources on the DL (e.g., not transmit on later time resources allocated to DL in a slot), etc. The victim BS may not schedule UL transmissions for its UEs on certain resources on the UL (e.g., not transmit on earlier time resources allocated to UL in a slot), not transmit on certain resources on the DL (e.g., not transmit on later time resources allocated to DL in a slot) (such as to avoid causing interference at the aggressor BS), etc.

In certain aspects, a victim BS is configured to perform or trigger RIM when it detects remote interference (referred to as remote interference detection) from an aggressor BS. For example, in certain aspects, if the victim BS detects interference levels above a threshold amount during resources scheduled for UL communication, the victim BS may trigger RIM. In certain aspects, the victim BS detects if an interference over thermal noise (IoT) level measured at the victim BS during resources scheduled for UL communication is above a threshold level (e.g., above an absolute threshold, rises by more than a threshold level, etc.).

Figure 8:
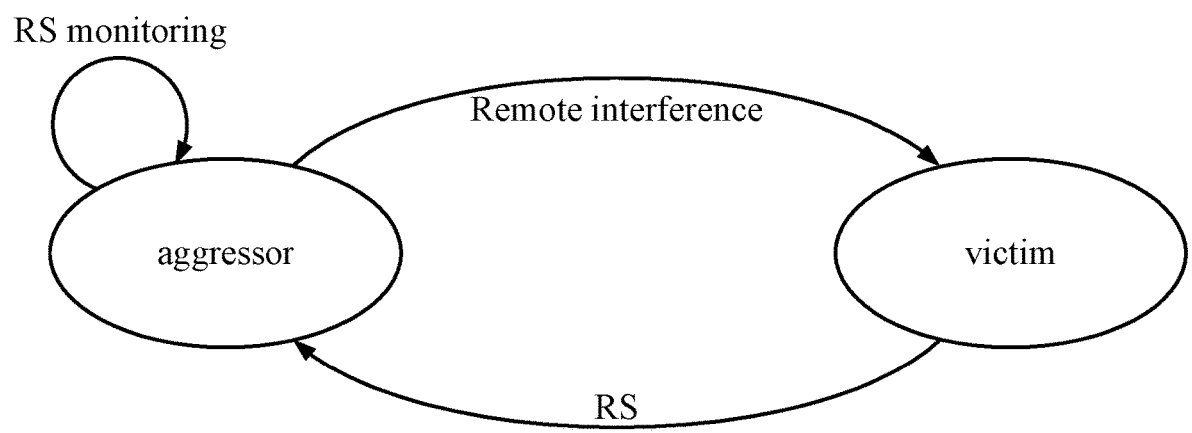
FIG. 8 illustrates an example system in which remote interference management may be implemented.

Example Reference Signal Monitoring Mechanism for Remote Interference Management As noted above, in some remote interference mitigation approaches, the victim first detects that the IoT level is above a threshold and, therefore, knows that remote interference may exist. FIG. 8 illustrates an example of how an aggressor base station (e.g., such as BS 610r of FIG. 6) may interfere with a victim base station (e.g., such as BS 610b of FIG. 6).

As illustrated in FIG. 8, the victim may then transmit a reference signal (RS) that may carry an identity (ID) associated with the victim. If the aggressor (monitoring for RS) detects the RS from victim, it may extract the ID of the victim. With knowledge of the ID of the victim, the aggressor may exchange information with the victim to help mitigate interference. This exchange of information may be accomplished, for example, over the air (OTA) or through the network (e.g., via a fiber backhaul connection).

The aggressor may also use this RS from the victim as an indicator for whether the environment (e.g., environmental conditions that led to the remote interference) has recovered and remote interference is gone. For example, if the aggressor no longer detects the RS transmitted from the victim, the aggressor may take this to mean the remote interference is gone.

In some cases, RS monitoring may be activated at the aggressor under certain scenarios. For example, RS monitoring may be activated if the aggressor also detects IoT above a threshold level, which could be due to remote interference from the victim. As another example, the aggressor may be manually configured by a network operator to monitor for the RS from the victim.

Aspects of the present disclosure provide mechanisms designed for RS monitoring activation at the aggressor for certain scenarios not addressed by current activation mechanisms. For example, the mechanisms presented herein may help activate RS monitoring in the case that interference from victim is too low to make IoT above threshold. In this case, with conventional activation mechanisms, the aggressor may never be activated to monitor RS from the victim.

Figure 9:
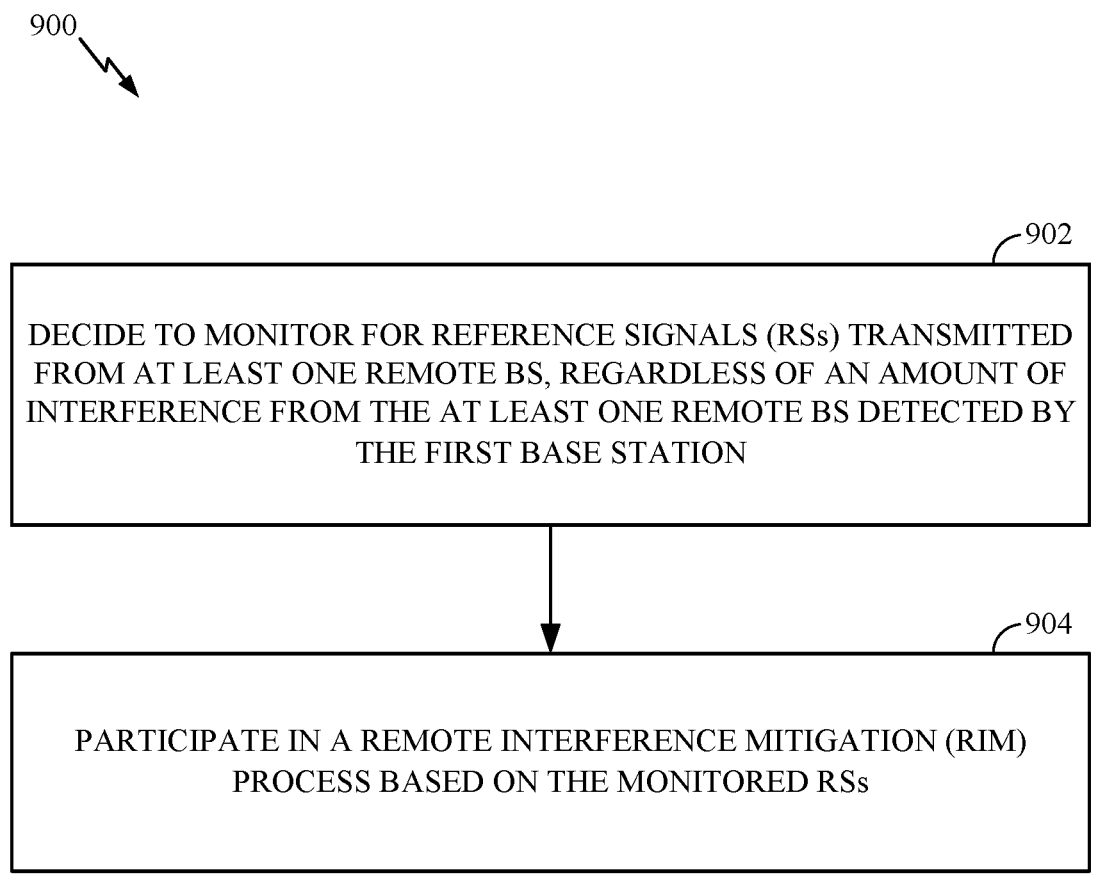
FIG. 9 illustrates example operations that may be performed by a wireless device for remote interference detection in accordance with aspects of the present disclosure.

According to a first example mechanism, however, the aggressor may unconditionally monitor RS from the victim. FIG. 9 illustrates example operations 900 that may be performed by an aggressor BS (e.g., BS 110r/610r), for remote interference management in accordance with this first mechanism. Operations 900 may be performed by an aggressor BS referred to as a first BS in FIG. 9.

Operations 900 begin, at 902, by deciding to monitor for reference signals (RSs) transmitted from at least one remote BS, regardless of an amount of interference from the at least one remote BS detected by the first base station. The decision may be based on signaling from a victim (e.g., OTA or via a backhaul) or from a network coordinator.

At 904, the aggressor participates in a remote interference mitigation (RIM) process based on the monitored RS. As noted above, in some cases, the aggressor may take a lack of RS signal detection as an indication the victim is no longer experiencing interference (e.g., and has ceased to transmit RS).

In some cases, rather than monitor based on signaling (e.g., from a victim or other network entity) or some other condition, an aggressor may always monitor RS (e.g., permanently or unconditionally). Further, there may be limits based on time. For example, there may be certain times of day or certain days where interference is less likely (or less likely to have an impact on users) and RS monitoring may not be performed, or may only be performed conditionally at those times).

FIG. 10 illustrates an example of an aggressor performing unconditional RS monitoring, in accordance with the first mechanism. While the aggressor may be configured to unconditionally monitor RS, in some cases, some limits may be put on which RS is monitored. For example, when the system contains many cells, there may be too many victims and too many associated RSs for the aggressor to feasibly detect. Thus, in such cases, it may be preferable to reduce the number of RSs to be detected.

Aspects of the present disclosure may accomplish this by preparing a list of victim cells that can be impacted by strong interference (i.e., that may likely make IoT above threshold) from the aggressor cell. This list may be prepared, for example, during network deployment and optimization and signaled to an aggressor. When the aggressor detects the RS from a victim, it may only monitor to detect RSs associated with victims in its list.

In some cases, this list can be further optimized during network operation. These optimization may be made based on signaling of interference from other base stations. In some cases, certain base stations may be more likely to experience (or be sensitive to) interference at certain times. In such cases, the aggressor may update its list as changes are made.

A second example mechanism may provide network operators with an automatic mechanism to activate RS monitoring at the aggressor. For example, according to this second mechanism, a victim may inform the aggressor to start monitoring RS from the victim through network signaling (e.g., via backhaul signaling/messaging).

Figure 11:
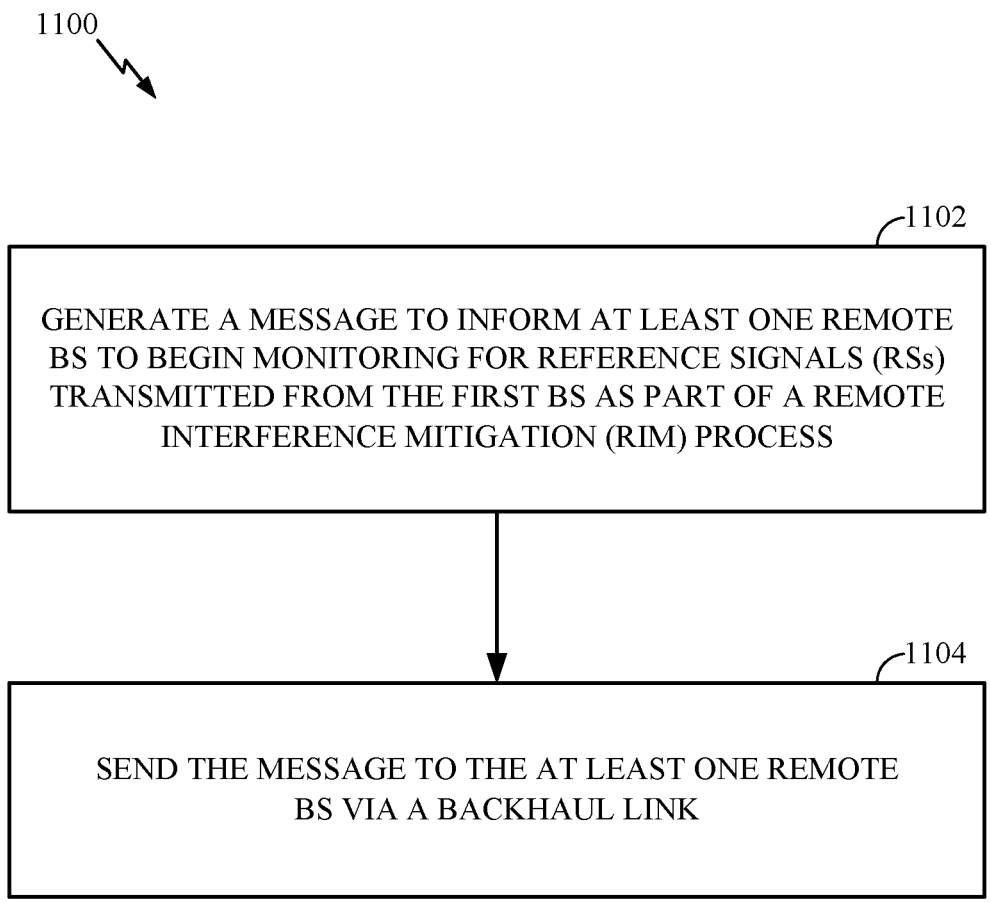
FIG. 11 illustrates example operations that may be performed by a wireless device for remote interference detection in accordance with aspects of the present disclosure.

FIG. 11 illustrates example operations 1100 that may be performed by a victim base station (e.g., BS 110/610b), to activate RS monitoring by an aggressor in accordance with the second mechanism. Operations 1100 may be performed by a victim B S (referred to as a first B S).

Operations 1100 begin, at 1102, by generating a message to inform at least one remote BS to begin monitoring for reference signals (RSs) transmitted from the first BS as part of a remote interference mitigation (RIM) process. At 1104, the victim sends the message to the at least one remote BS via a backhaul link.

Figure 12:
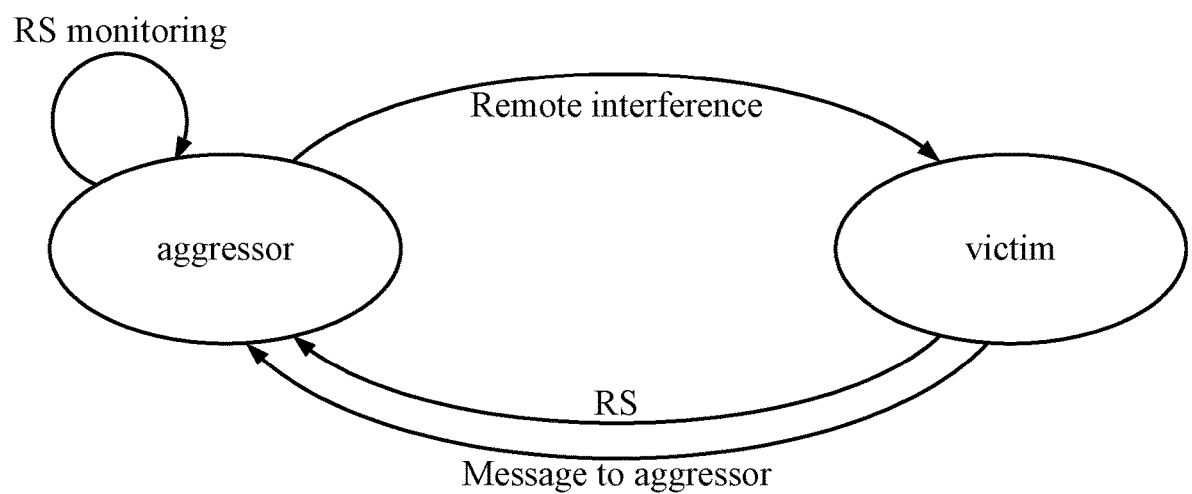
FIG. 12 illustrates an example system in which remote interference management in accordance with the operations of FIG. 11 may be implemented.

In this manner, the victim informs the aggressor to start monitoring its RS through network messaging, as shown in FIG. 12.

One challenge with this second mechanism is that the victim may not know which cell is its corresponding aggressor cell and, therefore, may not be able to send a unicast message to the aggressor. In this case, the victim may have to send broadcast messages to all cells, so that all cells including the actual aggressor cell start to monitor RS from the victim.

This may be problematic, for example, when the system contains many cells, network traffic for broadcast messages can be huge which can be a waste of network bandwidth. To address this case, a list may be used to limit the aggressor cells the victim BS needs to inform.

For example, for each victim cell, during network deployment and optimization, a list of cells that can be aggressor to the victim may be prepared. Based on this list, each victim may only send the activation message (to monitor its RS) to the list of aggressor cells associated with that victim. The lists for each victim may be further optimized during network operation and, in such cases, each victim may be signaled regarding any updates to its list.

Example Reference Signal Transmission

As described above, in certain remote interference mitigation approaches, RS transmission from the victim or aggressor is typically activated only if the victim or aggressor has identified the remote interference condition (e.g., has detected IoT above threshold or detected RS from the other side of the remote interference link).

Aspects of the present disclosure, however, provide techniques whereby a victim or aggressor may be configured to "permanently" or semi-statically transmit RS. As used herein, permanent transmission generally refers to continuous RS transmission (e.g., according to certain properties), until signaled to stop or an event is detected that indicates permanent transmission is no longer needed. Semi-static (or semi-persistent) transmission of RS may be triggered by a condition (e.g., timing, signaling, or interference detection) and may last for a certain time period, until another condition triggers a stop, or until signaled to stop.

Figure 13:
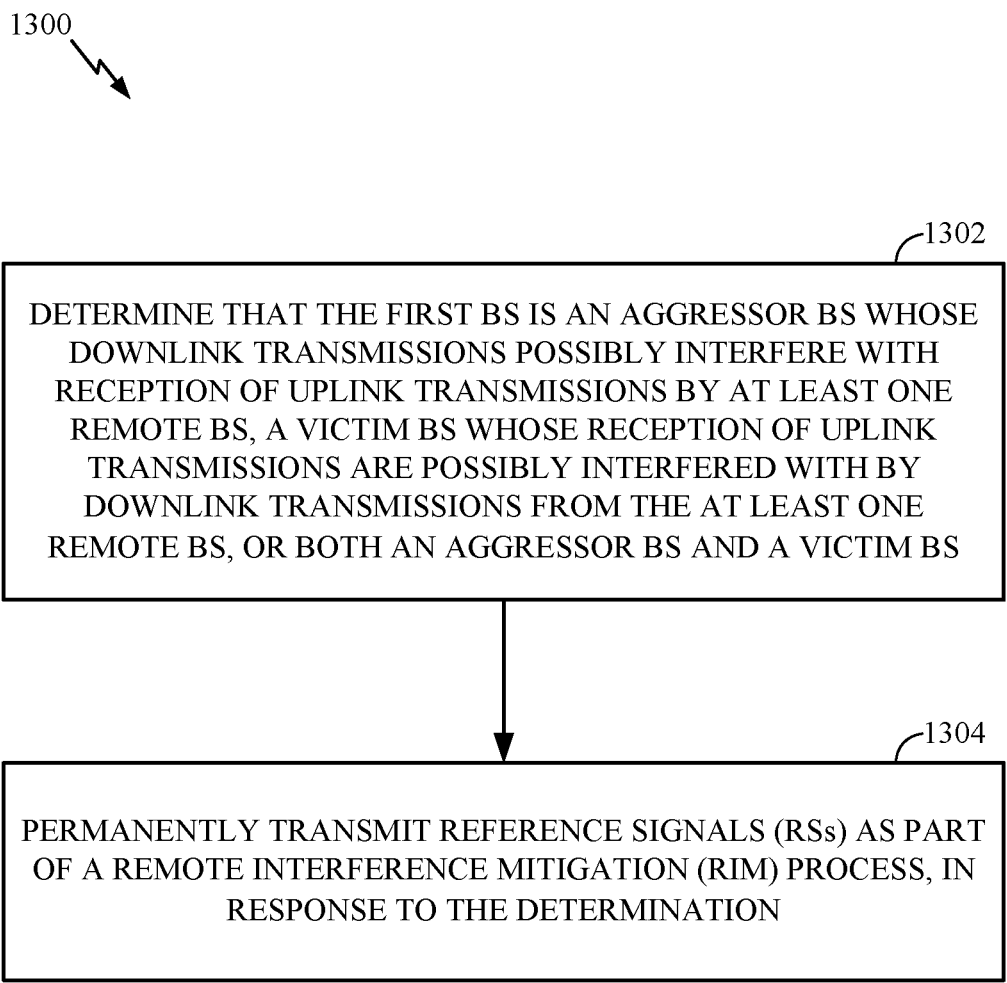
FIG. 13 illustrates example operations that may be performed by a wireless device for transmitting reference signals (RS) for remote interference management, in accordance with aspects of the present disclosure.

FIG. 13 illustrates example operations 1300 for (permanent or semi-static) RS transmission, in accordance with aspects of the present disclosure. Operations 1300 may be performed, for example, by a victim or aggressor BS.

Operations 1300 begin, at 1302, by determining that the first BS is an aggressor BS whose downlink transmissions possibly interfere with reception of uplink transmissions by at least one remote BS, a victim BS whose reception of uplink transmissions are possibly interfered by downlink transmissions from the at least one remote BS, or both an aggressor BS and a victim BS. At 1304 the (aggressor/victim) BS transmits reference signals (RSs) as part of a remote interference mitigation (RIM) process, in response to the determination.

According to this approach, a victim or aggressor may be configured to always transmit RS, for example, assuming RS transmission is needed (activated) by any step of the remote interference mitigation approach. In some cases, the RS transmission may be according to one or more properties, designed to avoid the waste of resources (bandwidth) due to the permanent RS transmission.

Examples of these properties include a reasonably low frequency of occurrence of the RS (e.g., at or below a threshold level). In some cases, only potential victim and aggressor cells may permanently transmit RS.

In some cases, frequency of occurrence of the RS transmission can be increased, for example, if the cell detects a remote interference (and decreased once the remote interference is no longer detected). Remote interference may be detected, for example, if the cell that transmits RS detects remote interference or RS from another remote cell and/or if the cell that transmits RS receives notification from another cell or network there is remote interference in the system.

Frequency of occurrence of the RS transmission from a base station can also be increased (meaning RS is transmitted more often), for example, if remote interference condition is identified or becomes worse in an area (e.g., multiple cells in a city or in a network segment either containing this cell or close to the cell of this base station).

This (e.g., unconditional) RS transmission approach may also be applied to current remote interference mitigation approaches in the way that if remote interference condition is identified or becomes worse in an area, RS transmission is activated at a base station even though remote interference condition is not identified by this base station itself.

Aspects of the present disclosure also provide techniques whereby a network operator may semi-statically enable remote interference RS transmissions at one or more cells.

Figure 14:
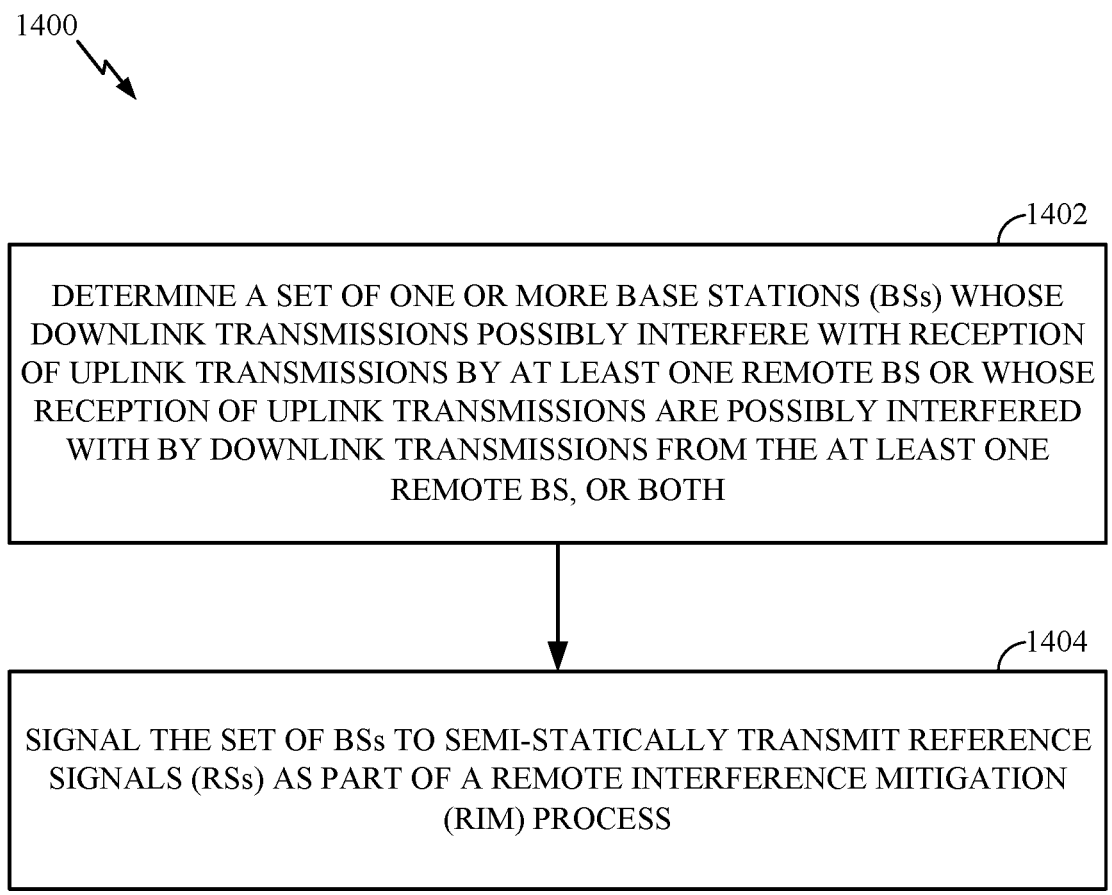
FIG. 14 illustrates example operations that may be performed by a network entity for enabling a base station to transmit reference signals (RS) for remote interference management, in accordance with aspects of the present disclosure.

FIG. 14 illustrates example operations 1400 that may be performed by a network entity for enabling a base station to transmit reference signals (RS) for remote interference management, in accordance with aspects of the present disclosure.

Operations 1400 begin, at 1402, by determining a set of one or more base stations (BSs) whose downlink transmissions possibly interfere with reception of uplink transmissions of at least one remote BS or whose reception of uplink transmissions are possibly interfered by downlink transmissions from the at least one remote BS, or both. At 1404 the network entity signals the set of BSs to semi-statically transmit reference signals (RSs) as part of a remote interference mitigation (RIM) process.

Depending on the scenario and desired result, the network may semi-statically enable remote interference RS transmission at all cells, at some clusters of cells, at some individual cells, or at a specific cell. The particular cells signaled may be determined according to a number of factors.

For example, in some cases, the exact cells signaled to semi-statically transmit RS may be based on interference measurement report from cells and UEs. In some cases, certain cells may be periodically signaled to semi-statically transmit RS (e.g., to periodically check for remote interference). In some cases, signaling of certain cells to semi-statically transmit RS may be triggered by specific events (e.g., feedback from certain cells, past network observations, or the like).

It may be appreciated that the mechanism for RS detection/monitoring of a remote interference mitigation approach at a base station may be updated, based on the particular RS transmission mechanism deployed. For example, if certain cells are configured to periodically transmit RS semi-statically, corresponding victim/aggressor cells may be configured to monitor for RS signals from only those cells during those periods.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIGS. 9, 11, 13, and 14, may be performed by various processors shown in FIG. 4.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 9 and/or 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a first base station (BS), the method comprising:
   generating a message to inform at least one remote BS to begin monitoring for reference signals (RSs) transmitted from the first BS as part of a remote interference mitigation (RIM) process; and
   sending the message to the at least one remote BS via a backhaul link.

2. The method of claim 1, further comprising:
   identifying the at least one remote BS from a list of cells whose downlink transmissions possibly interfere with reception of uplink transmissions by the first BS.

3. The method of claim 2, further comprising sending a message regarding the list of cells whose downlink transmissions possibly interfere with reception of uplink transmissions by the first BS.

4. The method of claim 3, wherein the first BS only sends the message only to the cells in the list.

5. The method of claim 3, further comprising sending a message updating the list of cells whose downlink transmissions possibly interfere with reception of uplink transmissions by the first BS.

6. The method of claim 1, further comprising transmitting the RS as part of the RIM process.

7. The method of claim 1, further comprising adjusting at least one of a frequency of occurrence of the RS transmission if:
   the first BS detects remote interference from the remote BS or another remote BS; or
   the first BS is notified of remote interference in a network by the remote BS, another remote BS, or the network.

8. A method for wireless communication by a first base station (BS), the method comprising:
   determining that the first BS is an aggressor BS whose downlink transmissions possibly interfere with reception of uplink transmissions by at least one remote BS, a victim BS whose reception of uplink transmissions are possibly interfered with by downlink transmissions from the at least one remote BS, or both an aggressor BS and a victim BS;
   transmitting reference signals (RSs) as part of a remote interference mitigation (RIM) process, in response to the determination; and
   wherein the first BS transmits RS as part of the RIM process until signaled to stop or the first BS determines a change in remote interference condition.

9. A method for wireless communication by a first base station (BS), the method comprising:
   determining that the first BS is an aggressor BS whose downlink transmissions possibly interfere with reception of uplink transmissions by at least one remote BS, a victim BS whose reception of uplink transmissions are possibly interfered with by downlink transmissions from the at least one remote BS, or both an aggressor BS and a victim BS;
   transmitting reference signals (RSs) as part of a remote interference mitigation (RIM) process, in response to the determination; adjusting the frequency of occurrence of the RS transmission if:
   the first BS detects remote interference from the remote BS or another remote BS; or
   the first BS is notified of remote interference in a network by the remote BS, another remote BS, or the network;
   wherein the RS is transmitted according to one or more properties designed to conserve time and frequency resources; and
   wherein the one or more properties comprise a frequency of occurrence.

10. The method of claim 9, further comprising adjusting the frequency of occurrence of the RS transmission if:
    a remote interference condition is identified or becomes worse in an area.

11. A method for communication by a network entity, the method comprising:
    determining a set of one or more base stations (BSs) whose downlink transmissions possibly interfere with reception of uplink transmissions by at least one remote BS or whose reception of uplink transmissions are possibly interfered with by downlink transmissions from the at least one remote BS, or both; and
    signaling the set of BSs to semi-statically transmit reference signals (RSs) as part of a remote interference mitigation (RIM) process.

12. The method of claim 11, wherein the set of BSs comprise BSs for:

all cells in an area, one or more clusters of cells, one or more individual cells, or a specific cell.

13. The method of claim 11, wherein the set of BSs is determined based on interference measurement reports from one or more cells or user equipments (UEs).

14. The method of claim 11, wherein the set of BSs is signaled to semi-statically transmit RSs as part of the RIM process periodically.

15. The method of claim 11, wherein signaling the set of BSs to semi-statically transmit RSs as part of the RIM process is triggered based on one or more events.

16. The method of claim 11, further comprising signaling one or more BSs to monitor for the semi-statically transmitted RSs.

* * * * *